//www.example.com
United States Patent [19]

Callanan et al.

[11] 4,455,900

[45] Jun. 26, 1984

[54] BRAKE LATHE

[75] Inventors: Dennis T. Callanan, West Hartford, Conn.; Gerald P. Lawson, Winona, Minn.; Francis J. Reardon, South Hadley, Mass.

[73] Assignee: Winona Tool Manufacturing Company, Winona, Minn.

[21] Appl. No.: 273,001

[22] Filed: Jun. 12, 1981

[51] Int. Cl.³ .............................................. B23B 5/02
[52] U.S. Cl. ...................................... 82/4 A; 82/28 R; 29/27 A
[58] Field of Search .................. 82/4 A, 15, 4 R, 2 A, 82/28 R; 51/106 R, DIG. 3; 29/27 A, 29, 560, 27 R, 27 B

[56] References Cited

U.S. PATENT DOCUMENTS

| | | | |
|---|---|---|---|
| 1,144,744 | 6/1915 | Wheeler | 29/27 B |
| 2,257,493 | 9/1941 | Blazek et al. | 82/4 A |
| 2,341,061 | 2/1944 | Rhodes et al. | 29/27 R |
| 3,049,953 | 8/1962 | Barrett | 82/24 R |
| 3,813,970 | 6/1974 | Mitchell | 82/4 A |
| 4,140,032 | 2/1979 | Besenbruch et al. | 82/4 A |

FOREIGN PATENT DOCUMENTS

| | | | |
|---|---|---|---|
| 311826 | of 1917 | Fed. Rep. of Germany | 82/15 |
| 1378421 | of 1964 | France | 82/4 A |

*Primary Examiner*—Leon Gilden
*Assistant Examiner*—Jerry Kearns
*Attorney, Agent, or Firm*—Kinzer, Plyer, Dorn & McEachran

[57] ABSTRACT

This is a brake lathe for refinishing the inner cylindrical surface on a brake drum or the two outer side surfaces on a brake disc. The brake lathe has an indexable spindle so that its tool slide only needs to move in one direction and the part being worked upon, be it a brake drum or a brake disc, can be oriented to the direction of movement of the tool slide.

1 Claim, 5 Drawing Figures

BRAKE LATHE

SUMMARY OF THE INVENTION

This invention is concerned with a brake lathe and is more specifically concerned with a brake lathe that is specifically constructed and arranged for refinishing either brake drums or brake discs.

A primary object of invention is a brake lathe that will turn both brake disc rotors and conventional brake drums.

Another object is a brake lathe of the above type which has a fixed spindle.

Another object is a brake lathe of the above type which has a single tool slide that moves in one direction and a fixed spindle which does not have to be moved axially.

Another object is a brake lathe of the above type which has a greatly simplified spindle arrangement which is not moved axially thereby avoiding complicated seals and bearing problems.

Another object is a brake lathe which avoids all of the problems with bearings, seals, etc., clearances and the like, involved with a linearly moving spindle.

Another object is a locking arrangement for an indexable spindle on a brake lathe of the above type.

Another object is a brake lathe of the above type which avoids the complexity of the linear motion of the spindle or the duplicity of the tool slides.

Another object is a positioning arrangement for accurately locating an indexable spindle of the above type.

Other objects will appear from time to time in the ensuing drawings.

DESCRIPTION OF THE PREFERRED EMBODIMENT

Figure 1:
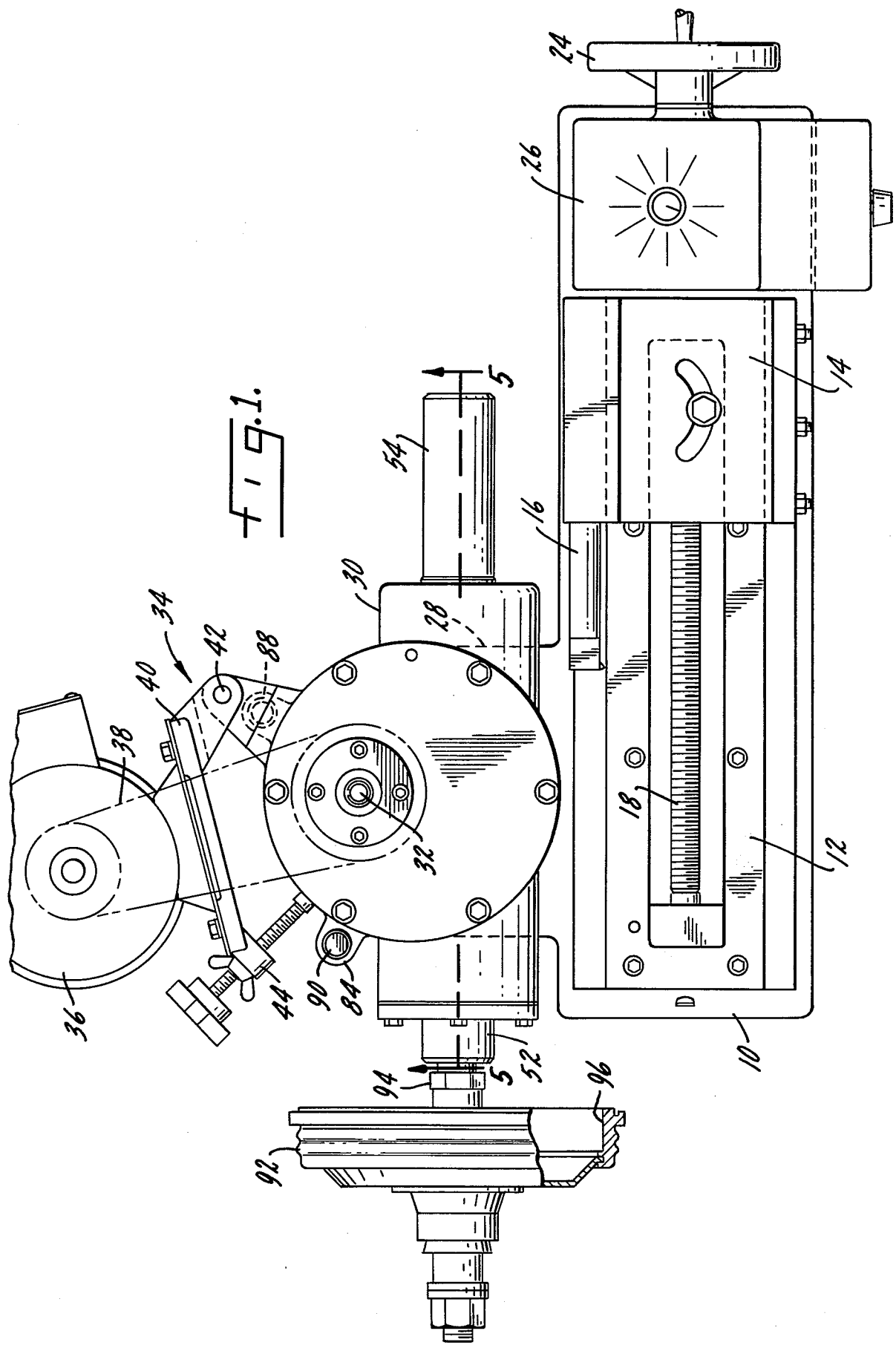
FIG. 1 is a top plan view of the machine, showing the spindle index for resurfacing a brake drum.
Figure 2:
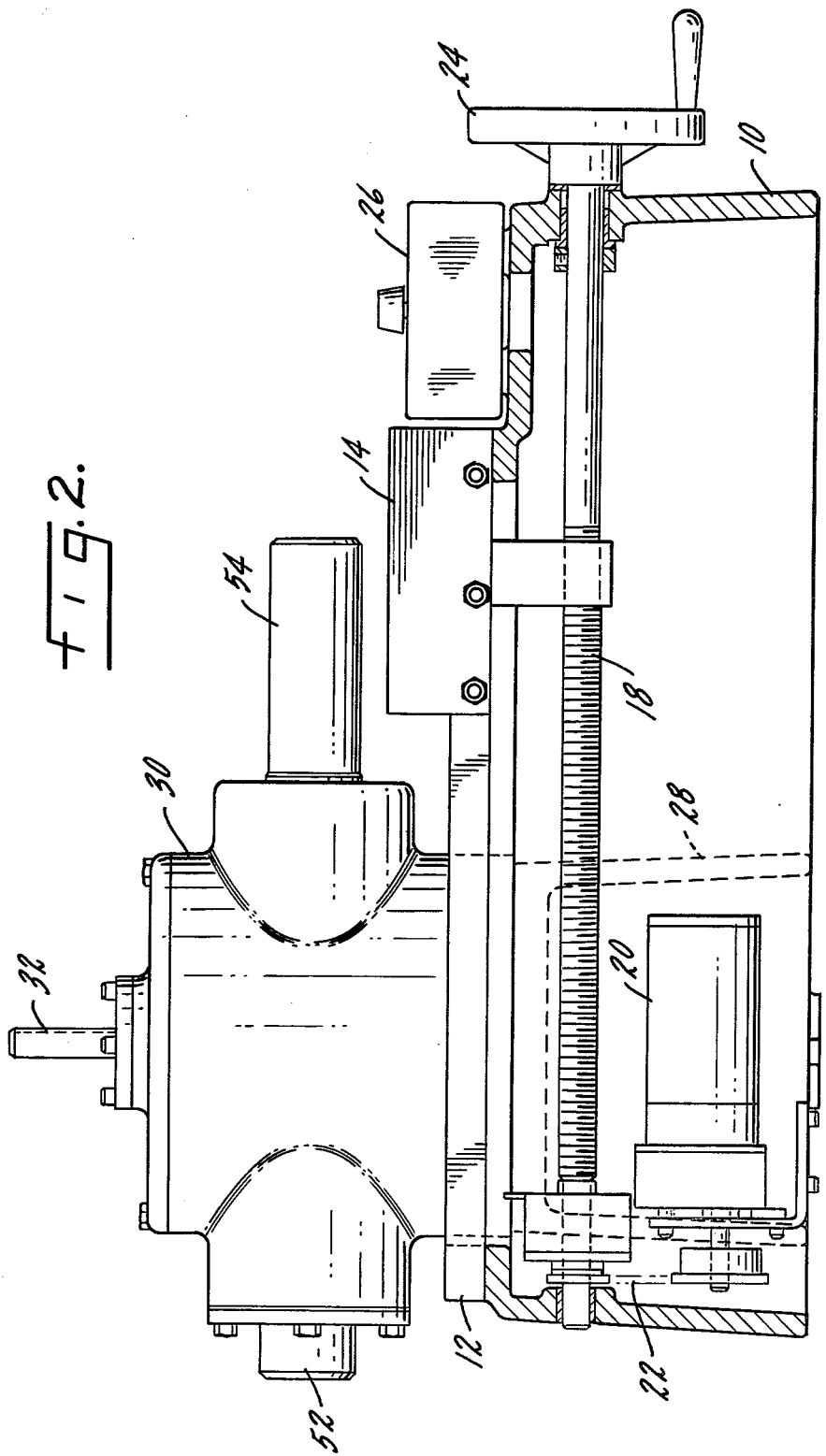
FIG. 2 is a side view with the base partly in section and with some parts omitted for clarity.

In FIGS. 1 and 2 the machine has been shown as having a base 10 which is more or less upright and has ways 12 on its upper surface for a tool slide or tool carriage 14 thereon which releasably supports a suitable tool 16 which, as shown in FIG. 1, is for refinishing or resurfacing the inside or inner surface of a brake drum. The tool slide is connected to a lead screw 18 which, in a conventional manner, may be power driven by a motor 20 through a chain or belt drive 22 and it may also be hand operated, as by a wheel or handle 24. Conventional control mechanism is indicated more or less at 26.

The base has an offset 28 on one side thereof which supports a spindle housing 30 having a power input shaft 32 projecting upwardly therefrom as shown in FIG. 2 to accept a drive 34, shown in FIG. 1, which may include an electric motor 36 which through a belt and pulley drive 38 may rotate the input shaft 32. A step pulley arrangement of a conventional type may be used. It will be recognized that all of the power mechanism shown in FIG. 1 is not repeated in FIG. 2. The power motor 36 is mounted on a motor base 40 which is pivoted at 42 on a suitable boss or ear arrangement formed on or connected to the spindle housing. The other end of the motor base may have an adjustment mechanism 44 of a suitable type to accurately position the motor base so that by pivoting the base clockwise in FIG. 1, the belt may be suitably tensioned or counterclockwise to release it.

Figure 5:
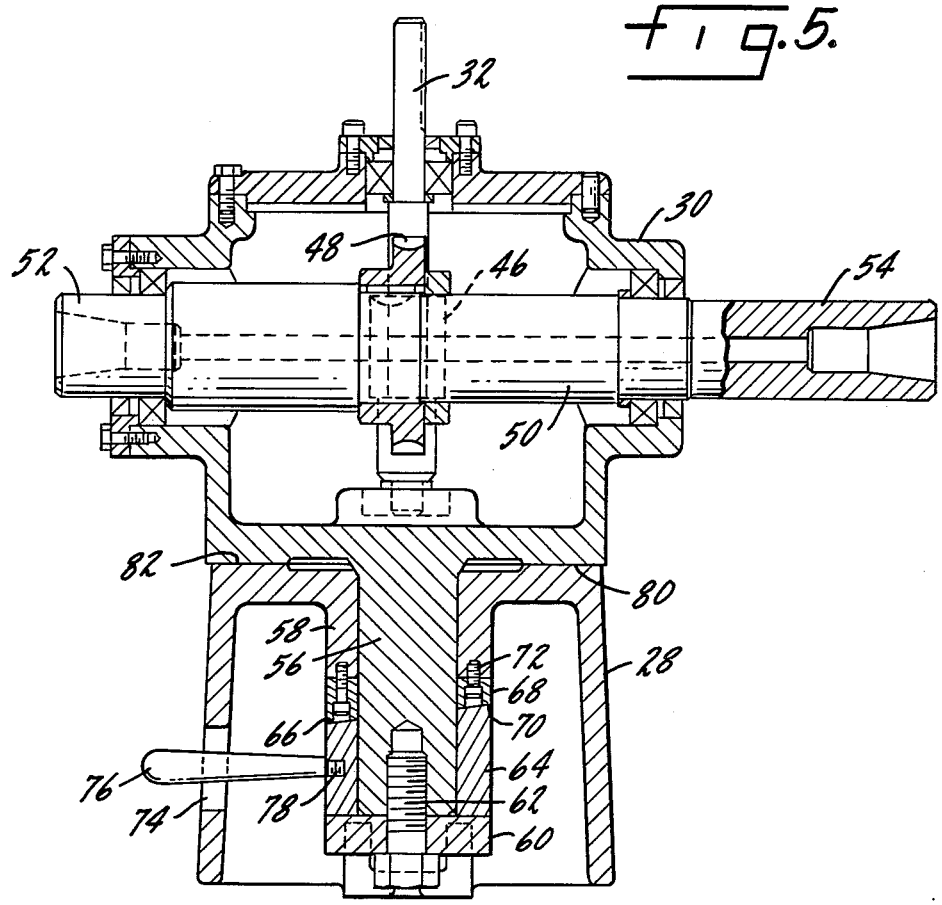
FIG. 5 is a section along line 5—5 of FIG. 1.

The inside of the spindle housing is shown in FIG. 5. The power input shaft 32 has a worm 46 or the like on the lower end thereof which engages a gear 48 in a conventional manner with the gear mounted on a spindle 50 which in turn projects from each end of the spindle housing. It will be noted that the right end of the spindle is longer than the left end but it might be otherwise or they may be the same depending upon other design dimensions. The short left end 52 will be referred to as the brake drum end while the somewhat longer right end 54 will be referred to as the brake disc end.

The bottom of the spindle housing 30 has a depending stub shaft 56 which extends down into a cylindrical boss 58 formed in the base offset 28. The bottom of the stub 56 carries a cap 60 by a bolt 62 with a sleeve 64 supported upwardly thereon. The upper surface 66 of the sleeve is formed on a diagonal and bears against a cam or wedge ring 68 the lower surface of which at 70 is at a corresponding angle, say, less than 7°. The ring 68 is fixed to the lower end of the boss or sleeve 58 by a suitable number of bolts or screws 72.

The base has a suitable opening 74 therein so that a handle 76 projects therethrough and is socketed into the sleeve 64 as at 78 in a suitable manner. The bottom surface 80 of the spindle housing rests against or on a suitable upper surface 82 on the base so that when the spindle housing is released by the wedge and handle mechanism 76, the spindle housing may be rotated which is to say that it may be indexed between two positions as explained hereinafter. The rotation or indexing would take place about a vertical axis in FIG. 5 which is to say about the stub 56 which will be centered in and controlled by the boss or sleeve 58.

Figure 4:
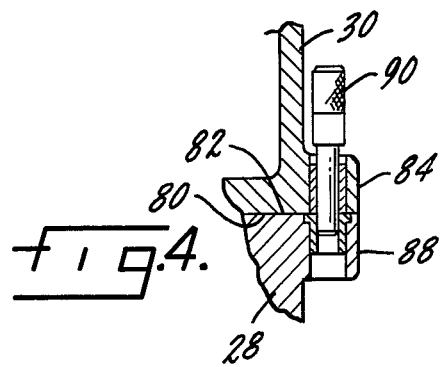
FIG. 4 is a section along line 4—4 of FIG. 3.

The spindle housing 30 has an outwardly projecting ear or lobe 84, in FIG. 1, which is constructed to oppose or match with two corresponding lobes or sockets 86 and 88 on the base extension 28. When the spindle housing is indexed into either one position or the other so that the ear 84 is aligned either with the left lobe 86 or the right one 88, a suitable pin 90 may be manually inserted, as shown in FIG. 4 so that the spindle housing will be fixed in either one position or the other.

The use, operation and function of the invention are as follows.

This brake lathe is intended to refinish or resurface the brake surfaces on either brake drums or brake discs. As shown in FIG. 1, a brake drum 92 of a conventional type is mounted on the short end 52 of the spindle by any suitable mounting mechanism 94, the details of which are not important here. The brake drum has the usual inner cylindrical surface 96 which becomes worn, uneven and scarred during use and from time to time must be refinished or resurfaced to a true cylindrical surface. With the spindle housing indexed to the position shown in FIG. 1, the lobe or ear 84 on the spindle housing will be aligned with the left socket 86 on the main frame or housing and the pin 90, upon insertion, will hold the spindle housing with the axis of the spindle parallel to the direction of the movement of the tool slide 14. In the arrangement shown the tool slide 14 may be moved to the left either by the hand crank 24 or by the power mechanism 20, and the tool 16 will rework the cylindrical surface 96 in the brake drum.

Figure 3:
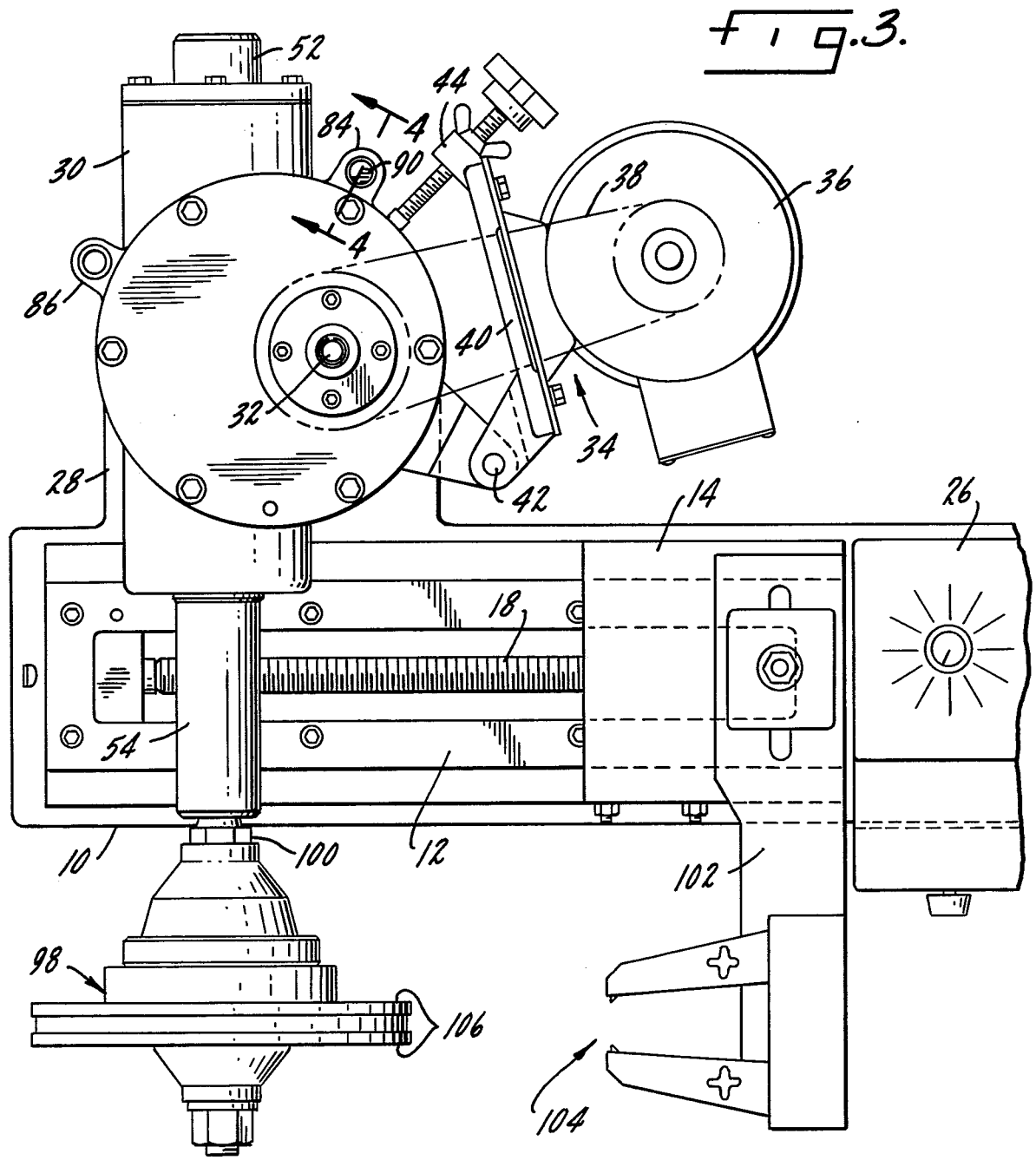
FIG. 3 is similar to FIG. 1 but with the spindle index for resurfacing a brake disc.

When the brake lathe is to be used to finish or refinish a brake disc, the pin 90 will be withdrawn from the aligning arrangement, the spindle housing will be indexed 90° clockwise from the FIG. 1 to the FIG. 3 position and the pin 90 reinserted through the ear 94 and into the base lug 88 so that the spindle will be positioned with its axis at 90° to the direction of movement of the tool slide which is generally the position shown in FIG. 3. Then a conventional brake disc 98 may be suitably mounted on the right end 54 of the spindle by a suitable mounting arrangement 100, the details of which are not important here. It will be noted that a different bracket 102 and tool assembly 104 has been mounted on the tool slide of a type specifically constructed to refinish the opposite parallel faces 106 of a brake drum. Again the tools would be brought to the brake disc either manually as at 24 or under power at 20.

When indexing the spindle housing between the FIG. 1 and 3 positions, when the pin 90 is removed, the handle 76 would also be backed off to release the wedge locked surfaces 66–70 so the spindle housing would be free. Thereafter when it is positioned in its new position, either as in FIG. 1 or FIG. 3, and the pin 90 is inserted, the handle 76 would be moved the other way to bind up the wedging surfaces so as to pull the stub shaft 66 down and firmly seat the base of the spindle housing on the upper surface of the main frame extension.

The unit has the advantage that it can be used to refinish either disc or brake drums which require movement of the finishing tool in opposite directions to the axis of the brake part. For a brake drum, as in FIG. 1, the refinishing tool moves parallel to the axis of the part whereas for a brake disc, the finishing tool moves at right angle to the axis of the part. If the spindle stays in one position, then two tool slides must be used, one that moves parallel to the spindle axis and the other that moves at right angles to it. Or if a single tool slide is used having only one direction of movement, the tool slide could be moved to finish one type of brake and the spindle axis moved to finish the other. But moving the spindle axis is quite complex, creates bearing problems, inherently causes the spindle to be somewhat loose, and creates sealing problems to prevent dirt and dust from getting into the bearings and seals. A spindle that moves parallel or back and forth on its own axis is a complicated, difficult and expensive mechanism.

By indexing the spindle housing between the positions, 90° apart, between the rotor mode and drum mode, one tool slide direction can be used, and the spindle itself does not have to be moved axially. At the same time the mechanism for indexing the spindle housing is quite simple, creates no sealing problems and no bearing difficulties.

Whereas the preferred form and several variations of the invention have been shown and suggested, it should be understood that suitable additional modifications, changes, substitutions and alterations may be made without departing from the invention's fundamental theme.

The embodiments of the invention in which an exclusive property or privilege is claimed are defined as follows:

1. In a brake lathe, a base, a tool slide and tool holder on the base adapted to hold a brake refinishing tool, means for moving the tool slide and tool holder on the base in a defined direction to perform a working operation, a spindle housing mounted on the base and having a rotatable spindle mounted thereon for releasably holding either a brake drum or a brake disc to be refinished, power means for rotating the spindle, means for indexing the spindle housing, and thus the spindle, through 90° to dispose the spindle either parallel to the direction of movement of the tool slide in a brake drum refinishing position or at right angles to the direction of movement of the tool slide in a brake disc finishing position, means for releasably locking the spindle housing in each of these two positions, and work holding means at each end of the spindle constructed and arranged so that a brake drum may be releasably mounted on one end of the spindle and a brake disc may be releasably mounted on the other end of the spindle.

* * * * *